(12) United States Patent
Patton

(10) Patent No.: US 7,728,830 B2
(45) Date of Patent: Jun. 1, 2010

(54) METHOD AND APPARATUS FOR CONTROLLING NANO-SCALE PARTICULATE CIRCUITRY

(75) Inventor: Charles Patton, Eugene, OR (US)

(73) Assignee: SRI International, Menlo Park, CA (US)

(*) Notice: Subject to any disclaimer, the term of this patent is extended or adjusted under 35 U.S.C. 154(b) by 979 days.

(21) Appl. No.: 10/861,309

(22) Filed: Jun. 4, 2004

(65) Prior Publication Data

US 2005/0270861 A1    Dec. 8, 2005

(51) Int. Cl.
*G09G 5/00*    (2006.01)

(52) U.S. Cl. .................................. 345/205; 345/107

(58) Field of Classification Search ............... 345/107, 345/108, 87, 55, 81, 94, 205, 214; 359/296; 365/200; 349/141, 143
See application file for complete search history.

(56) References Cited

U.S. PATENT DOCUMENTS

| | | | | |
|---|---|---|---|---|
| 5,751,719 A | * | 5/1998 | Chen et al. | 370/473 |
| 6,157,375 A | * | 12/2000 | Rindal et al. | 345/208 |
| 6,753,845 B1 | * | 6/2004 | Keeney et al. | 345/108 |
| 7,142,199 B2 | * | 11/2006 | Jang et al. | 345/204 |
| 7,193,594 B1 | * | 3/2007 | Yamazaki et al. | 345/89 |

* cited by examiner

*Primary Examiner*—Abbas I Abdulselam

(57) ABSTRACT

Method and system for controlling nano-scale circuitry. Specifically, the present approach employs inverse GPS-like and multihop methodologies to provide individualized control of nano-scale particulate circuitry.

29 Claims, 11 Drawing Sheets

METHOD AND APPARATUS FOR CONTROLLING NANO-SCALE PARTICULATE CIRCUITRY

The present invention relates to a method and apparatus for controlling nano-scale circuitry. More specifically, the present approach employs inverse GPS-like and multi-hop methodologies to provide individualized control of nano-scale particulate circuitry.

BACKGROUND OF THE INVENTION

Miniaturization of electronic components has been an important goal of engineers. Various products ranging from liquid crystal display (LCD) panels to inkjet print heads are evidence of their success. These products provide dazzling results while reducing the overall footprint of the product.

However, miniaturized products are often expensive because they are difficult to produce and yield is often lower then non-miniaturized version of the same product. The higher cost and lower yield have affected how miniaturized products are developed and marketed. For example, it is uncommon to find full-page inkjet print heads.

One of many criticalities involved in miniaturized products is the manner of addressing individual elements, which may be identically structured, distributed in space. There are currently only a few methods of addressing these individual elements.

The first, and arguably the oldest, method is physical addressing wherein the means of physical interaction has a limited physical extent and that means itself is relocated to the region where the desired interaction is to take place. An example of this technique includes the CRT, where the identically structured elements are the screen phosphor dots and the means of interaction is the electron beam.

A second method is matrix addressing wherein each element is connected to two electrical circuit elements (so-called "row elements" and "column elements"), so that if a single row element is connected across a voltage source to a single column element, only a single of the elements experiences a voltage drop across its pair of connections. Examples of this technique include the LCD, the inkjet print head itself, and various memory devices.

Unfortunately, the problem with both of these methods, and other similar techniques, is that they don't scale well enough to deal with the numbers of elements, which may be identically structured, to be addressed as the technologies for producing and distributing these elements have advanced. It is already the case that expenses arising from interconnect requirements (e.g., pin count) dominate the cost of producing memory chips, and the physical difficulty and complexity of implementing the matrix addressing method limits the size of the apparatus to address only a small number of logical pixels at a time, e.g., capping the useable number of inkjet nozzles on a print head at about the current number found in most printers.

Additionally, as elements, which may be identically structured, e.g., nanochips, continue to be deployed in greater numbers and in ever smaller sizes, these traditional addressing methods are simply inadequate to handle the evolution of nano-scale circuitry. In fact, these addressing methods continue to be a limitation on the deployment of nano-scale technology.

Therefore, a need exists for a method and apparatus for controlling nano-scale circuitry.

SUMMARY OF THE INVENTION

In one embodiment, the present invention provides a method and system for controlling elements, which may be identically structured, e.g., nano-scale circuitry. More specifically, the present approach employs inverse GPS-like and multihop methodologies to provide individualized control of nano-scale particulate circuitry.

In one embodiment of the present invention, the method of addressing elements is based on the premise that in wave-like propagation in a two-dimensional medium, three wavefronts emanating from three distinct points or sources will have a single point of triple intersection. In turn, by choosing a suitable delay between initiating the waves at the three points, any point in a suitable region may be made to be that point of triple intersection. Thus, by varying the timing of initiation, any point may be addressed. In other words, a structured element, e.g., a nanochip, that receives all the control signals at the same time will know that it has been selected or addressed. The number of control signals necessary to address a structured element is application specific, e.g., two control signals can address a row or column of structured elements, three control signals can address a particular structured element on a two-dimensional medium, four control signals can address a particular structured element on a three-dimensional medium and so on.

In an alternative embodiment, the control signals from the sources can be propagated by the structured elements themselves. This approach is termed "multi-hop" addressing, where each structured element propagates the control signal to its immediate neighboring nodes. One advantage of the multi-hop approach is that the strength or magnitude of the source signals can be minimized. Namely, the strength of the source signals needs only to be strong enough to reach one of the structured elements, where the source signals will eventually be propagated to all the structured elements in the entire system.

The present addressing methods and apparatus are highly scalable in terms of number since it would require only a few connection points, e.g., three connection points, regardless of the number of addressable elements present within the overall system. It would also be highly scalable in term of space since wave propagation is capable of spanning great distances. The present invention is highly applicable, but not limited to, applications that employ nano-scale circuitry, where physical size, power consumption and the number of interconnections are often limiting constraints.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention provides a method and system for controlling elements, which may be identically structured, e.g., nano-scale circuitry. More specifically, the present approach employs inverse GPS-like and multihop methodologies to provide individualized control of nano-scale particulate circuitry.

Figure 1:
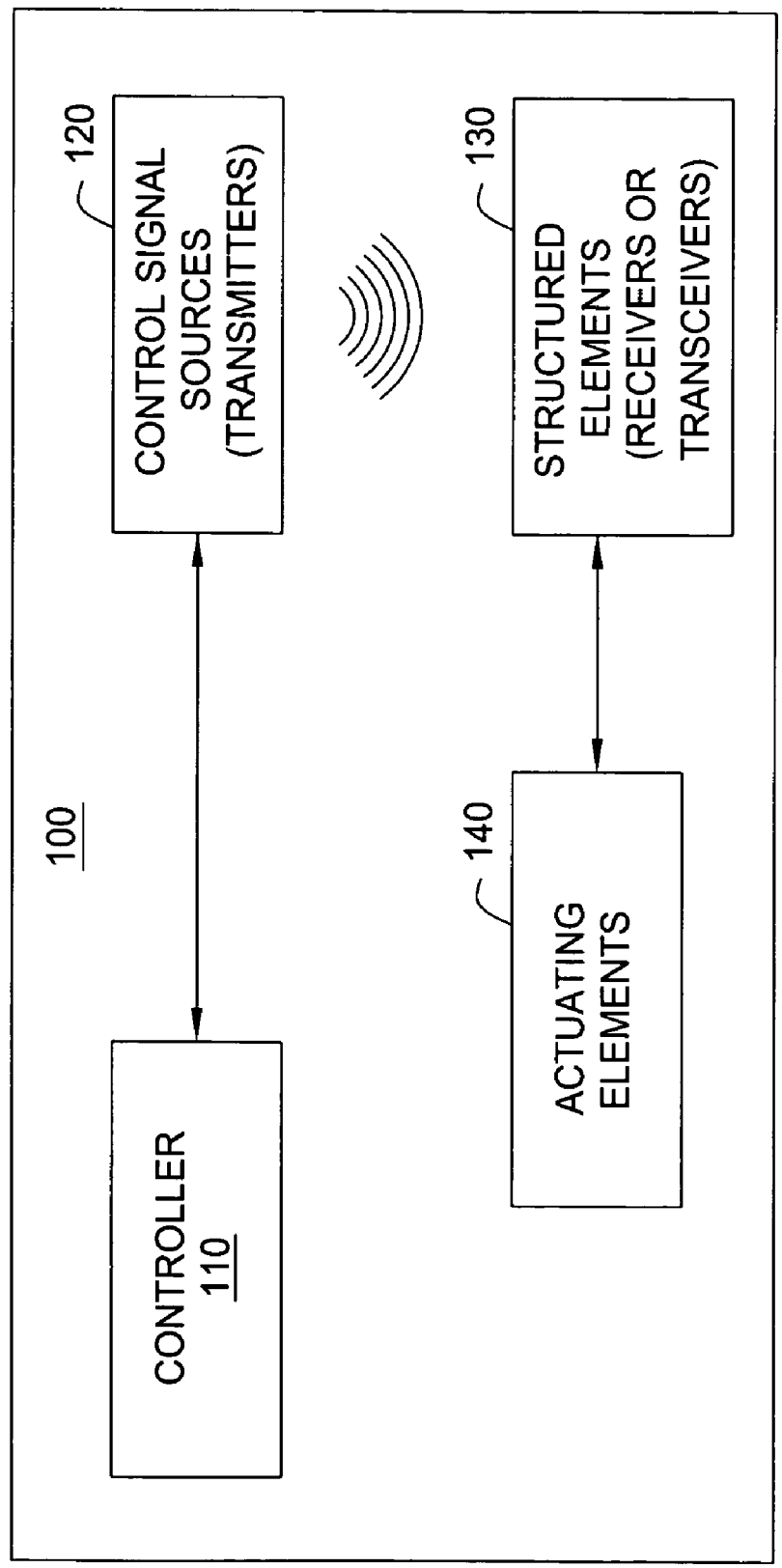
FIG. 1 illustrates a block diagram of a system of the present invention.

FIG. 1 illustrates a block diagram of an exemplary system 100 of the present invention. The system 100 comprises a controller 110, a plurality of control signal sources 120, a plurality of structured elements 130 and a plurality of actuating elements 140. In one embodiment, the controller 110 can be implemented using a general-purpose processing device, e.g., a central processing unit (CPU), that operates with a memory and various I/O devices (not shown) to implement various methods of the present invention. As such, the methods of the present invention (including associated data structures) can be stored on a computer readable medium, e.g., RAM memory, magnetic or optical drive or diskette and the like.

In operation, the controller 110 is tasked with controlling the actuating elements of the apparatus. For example, if the apparatus 100 is a display device, then the actuating elements may comprise pixel circuitry. If the apparatus 100 is a printing device, then the actuating elements may comprise printing nozzles. If the apparatus 100 is a microfluidic device for combinatorial chemistry, then the actuating elements may comprise microfluidic pumps or gates. If the apparatus 100 is a projection device, then actuating elements may comprise a micro-electro-mechanical mirror (e.g., see FIG. 8). If apparatus 100 is a polymerizing device, then the actuating elements may comprise heating elements (e.g., see FIG. 9).

In the present invention, the controller 110 will communicate with a plurality of control signal sources 120 to address one or more of the actuating elements 140. Control signal sources need not be, and in general are not, devices of the same scale as the structured devices. For example, they may be ordinary integrated circuit amplifiers/transmitters connected via wires to display driver circuitry. Or they may be surface acoustic wave generators connected, in turn, to a chemical synthesis process controller. Or they themselves may be externally controlled micro-fluidic pumps that inject neurotransmitter-like chemicals into the substrate around them.

In one embodiment, the control signal sources 120 have transmitters that allow the control signal sources to broadcast their control signals to a plurality of structured elements 130 having receivers. One novel aspect of the present invention is that there are no physical connections between the control signal sources 120 and the plurality of structured elements 130. This architecture allows the deployment of nano-scale particulate circuitry or nanochips in the apparatus, without the traditional constraints in terms of interconnect requirements. There is no need to etch or to layout the nano-scale circuitry or nanochips in a manner that must account for interconnection with a control device.

In turn, the structured elements having received the control signals will, in turn, effect the activation of the relevant actuating elements in accordance with the control signals, e.g., causing the relevant pixel(s) to illuminate, causing the relevant nozzle(s) to eject ink or causing the relevant pump(s) to move a fluid from one chamber to another chamber. It should be noted that although the present invention discloses the structured elements 130 and the actuating elements 140 as separate devices, those skilled in the art will realize that the functions performed by these devices can be implemented into a single device.

Figure 2:
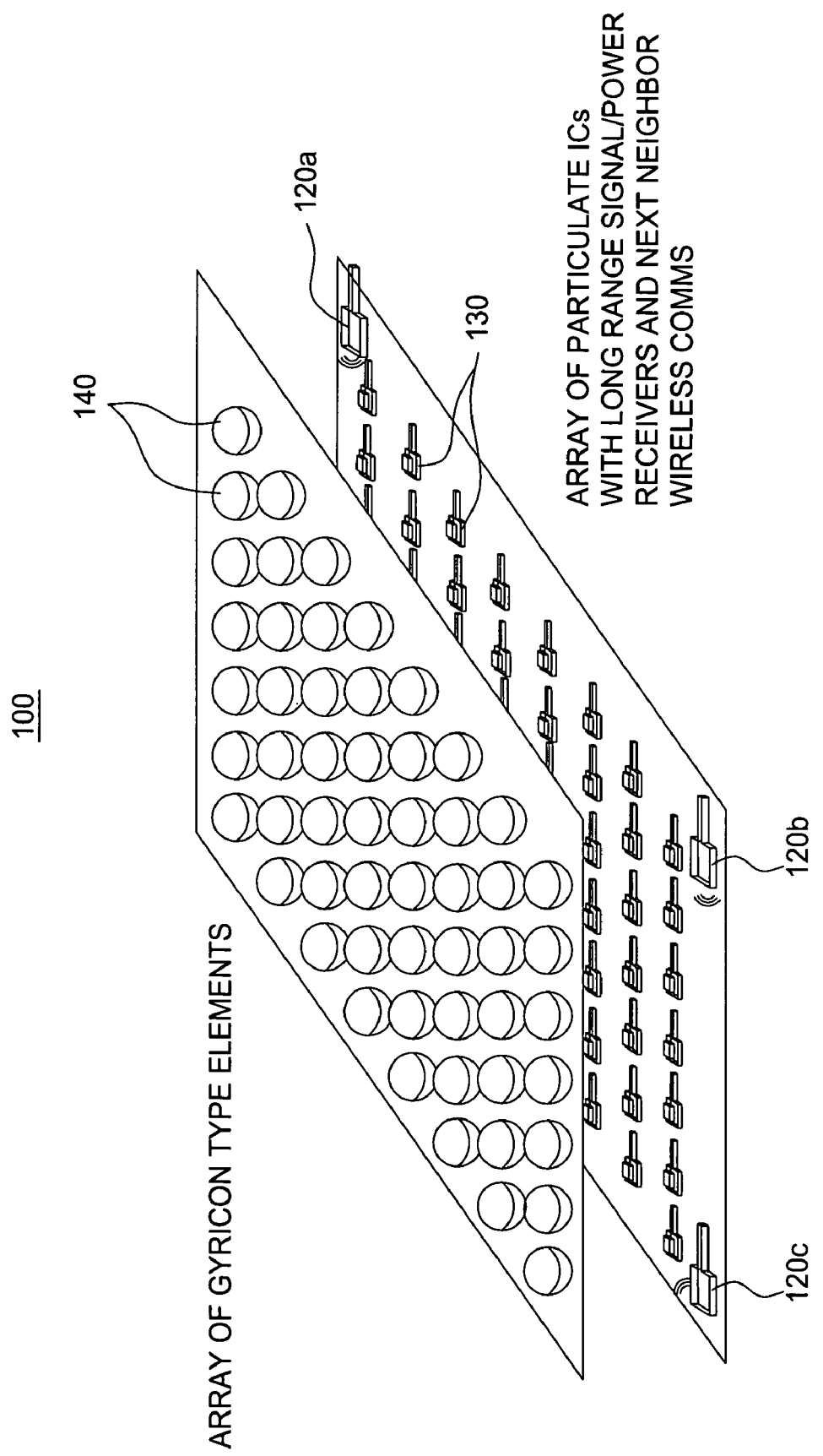
FIG. 2 illustrates an exemplary array of structured elements that can be addressed to activate an array of actuating elements in accordance with the present invention.

FIG. 2 illustrates an exemplary array of structured elements 130 that can be addressed to activate an array of actuating elements 140 in accordance with the present invention. The apparatus 100 also employs a plurality of control sources 120a-c that has no physical connections to the array of structured elements 130.

In one embodiment of the present invention, the method of addressing the elements, which may be identically structured, 130 is based on the premise that in wave-like propagation in a two-dimensional medium, three wavefronts emanating from three distinct points or sources 120a-c will have a single point of triple intersection. In turn, by choosing a suitable delay between initiating the waves at the three sources, any location in a suitable region may be made to be that point of triple intersection. Thus, by varying the timing of initiation of the control signals by the sources 120a-c, any structured element may be addressed. In other words, a structured element, e.g., a nanochip, that receives all the control signals at the same time will know that it has been selected or addressed. The number of control signals necessary to address a structured element is application specific, e.g., two control signals can address a row or column of structured elements, three control signals can address a particular structured element on a two-dimensional medium, four control signals can address a particular structured element on a three-dimensional medium and so on.

The global positioning system (GPS) employs a similar approach but rather than varying the timing of the initiation to address a particular point, GPS keeps the timing fixed so that the receiving stations can determine their position from the timing of the arrival of the wavefronts. In contrast to the GPS approach, the present invention partakes of the inverse of GPS.

In an alternative embodiment, the control signals from the sources can be propagated by the structured elements themselves. This approach is termed "multi-hop" addressing, where each structured element propagates the control signal to its immediate neighboring nodes. In one embodiment, the control signals are only propagated to neighboring nodes that have yet to receive the control signals.

One advantage of the multi-hop approach is that the strength or magnitude of the source signals can be minimized. Namely, the strength of the source signals needs only to be strong enough to reach at least one of the structured elements, where the source signals will eventually be propagated to all the structured elements in the entire system.

The present addressing methods and apparatus are highly scalable in terms of number since it would require only a few connection points, e.g., three connection points, regardless of the number of addressable elements present within the overall system. It would also be highly scalable in term of space since wave propagation is capable of spanning great distances.

The present invention is highly applicable, but not limited to, applications that employ nano-scale circuitry, where physical size, power consumption and the number of interconnections are often limiting constraints. Namely, significant advances have been made in the technology to produce dust-sized integrated circuits (nanochips) and to uniformly distribute them across a relatively large substrate in huge numbers. Being in such close proximity to one another (tens of microns, perhaps) the signal propagation between elements can take place at base-band, through oscillator (chaotic or otherwise) synchronization, thereby avoiding the complexity and power requirements on full RF band transmissions. In addition, the power requirements of such devices are sufficiently small that they may be supplied by an externally applied RF signal, which could then be used to provide synchronization as well. Additionally, the nanochips can be programmed with instructions to implement the wireless addressing methods as discussed above.

Figure 3:
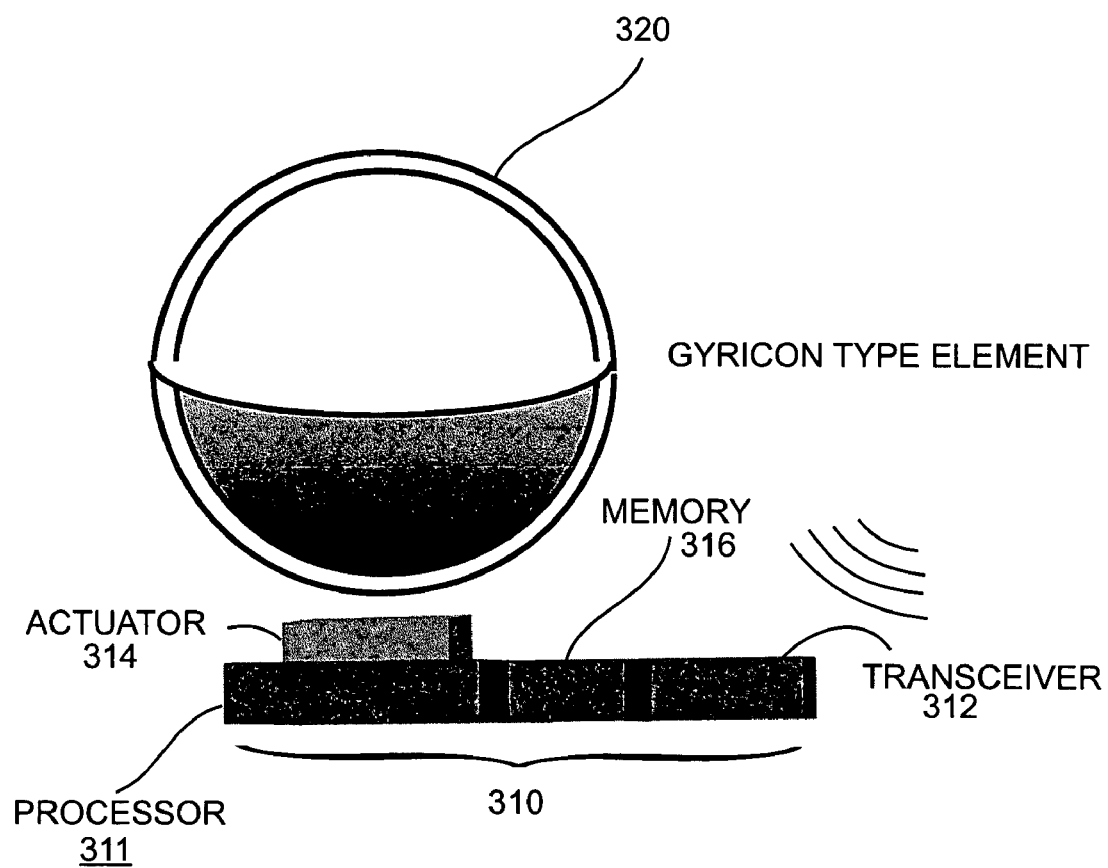
FIG. 3 illustrates a structured element and an actuating element.

FIG. 3 illustrates a structured element 310 and an actuating element or gyricon type element 320 of the present invention. For example, electronic reusable paper may utilize a twisting-ball display technology, invented at the Xerox Palo Alto Research Center (PARC), referred to as a gyricon (see, e.g., U.S. Pat. No. 5,754,332). A gyricon sheet is a thin layer of transparent plastic in which millions of small beads, somewhat like toner particles, are randomly dispersed. The beads, each contained in an oil-filled cavity, are free to rotate within those cavities. The beads are "bichromal," with hemispheres of two contrasting colors (e.g. black and white, red and white), and charged so they exhibit an electrical dipole. When voltage is applied to the surface of the sheet, the beads rotate to present one colored side to the viewer. Voltages can be applied to the surface to create images such as text and pictures. The image will persist until new voltage patterns are applied.

The structured element 310 may comprise a processor 311, a transceiver 312, an actuator 314, and an optional memory 316. In operation, the transceiver 312 receives a plurality of control signals. If the processor 311 of the structured element 310 determines that the relevant control signals have been received at the same time, then the structured element 310 is deemed to be selected or addressed, thereby causing the actuator 314 to engage the gyricon type element 320. Since gyricon type element 320 may be activated by the presence of a voltage, the actuator 314 may be implemented as a device or voltage source that presents a voltage to the gyricon type element 320 to effect movement of the gyricon type element 320.

Alternatively, the structured element 310 may employ a memory 316 to store data relating to whether the structured element 310 has been addressed. For example, if the structured element 310 is deemed to be selected or addressed, the structured element 310 may simply load that information into the memory 316 without actually activating the actuator 314. When another control signal is received that is for triggering the actuator, then all structured elements 310 that have stored data indicating that they have been addressed will then activate their actuator. This approach allows structured elements 310 to be loaded first prior to activating the actuator 314. This two-step approach will reduce the time necessary for the controller to activate the gyricon type elements 320, i.e., addressing the relevant gyricon type elements 320 prior to the time when the gyricon type elements 320 are actually engaged or loading data for some gyricon type elements 320, while other gyricon type elements 320 are currently being engaged.

Figure 4:
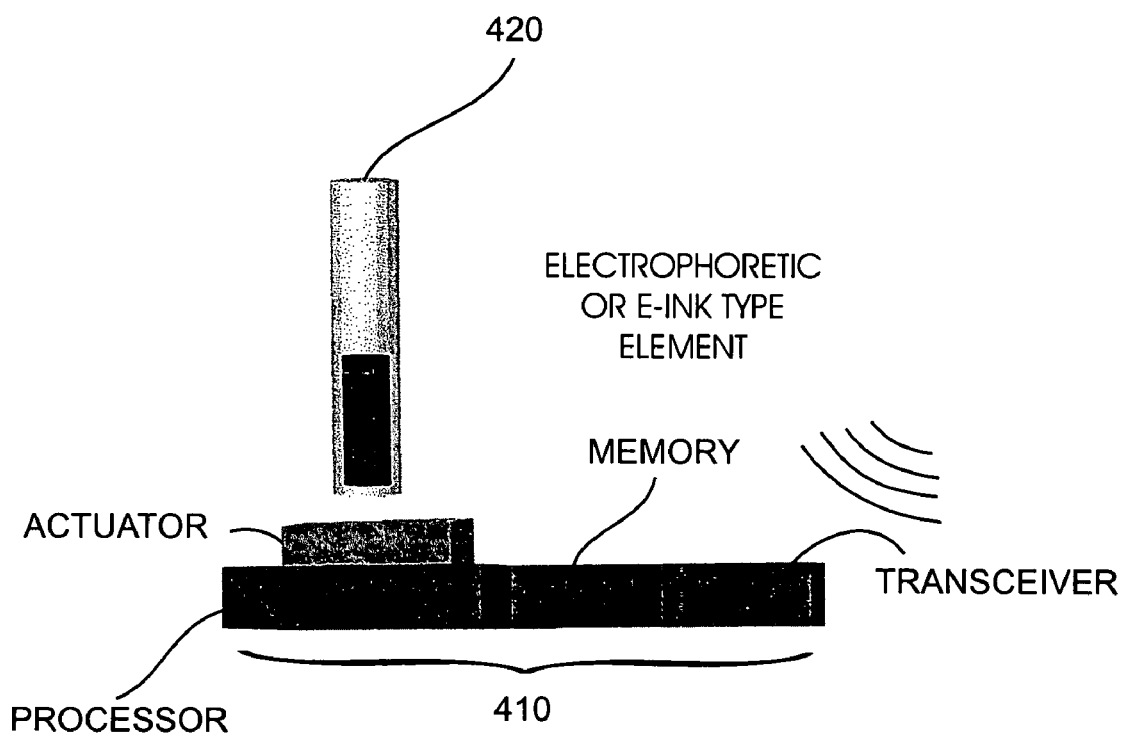
FIG. 4 illustrates a structured element and an alternate actuating element.

FIG. 4 illustrates a structured element 410 and an alternate actuating element 420 of the present invention. The structured element 410 is similar to the structured element 310 of FIG. 3 and a description of the structured element is provided above.

The actuating element 420 in this instance is an element, e.g., an e-Ink type element, having the ability to displace a fluid, e.g., ink, electronically. When the actuator of the structured element 410 is engaged, a portion of the fluid stored within the actuating element 420 is then discharged, e.g., onto a piece of paper.

Figure 5:
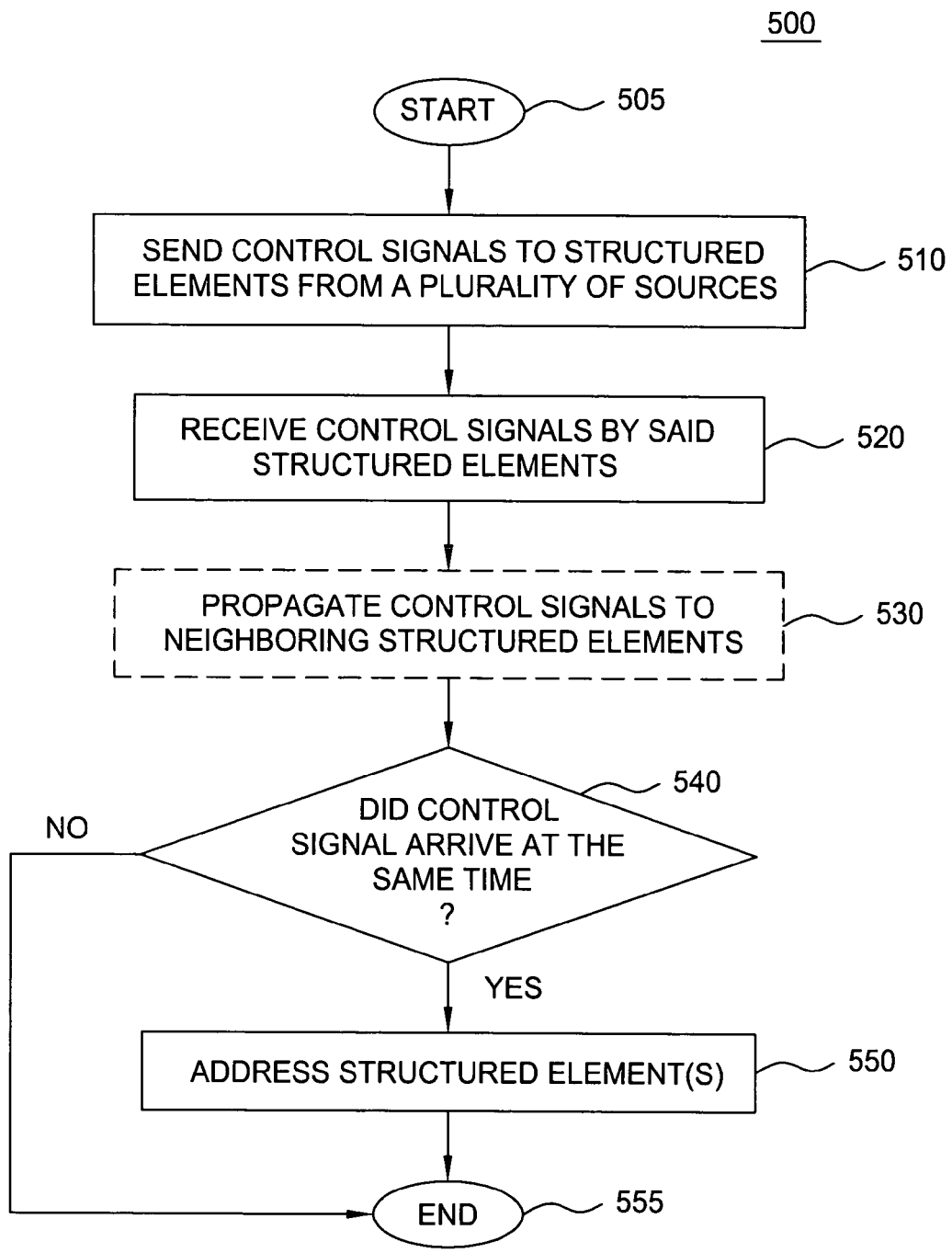
FIG. 5 illustrates a method for addressing an array of structured elements.

FIG. 5 illustrates a method 500 for addressing an array of structured elements. Method 500 starts in step 505 and proceeds to step 510.

In step 510, method 500 sends a plurality control signals to the array of structured elements. Specifically, the timing of initiation of the control signals by the sources is varied such that any structured element may be addressed.

In step 520, at least one of the structured elements has received the control signal(s). In one embodiment, the structured elements may propagate the control signal(s) in step 530 to neighboring structured elements in accordance with a multi-hop approach.

In step 540, method 500 queries whether the relevant control signals have arrived at the same time for at least one of the structured elements. If the query is positively answered, then method 500 addresses the relevant structured element(s) in step 550. If the query is negatively answered, then method 500 ends in step 555.

Figure 6:
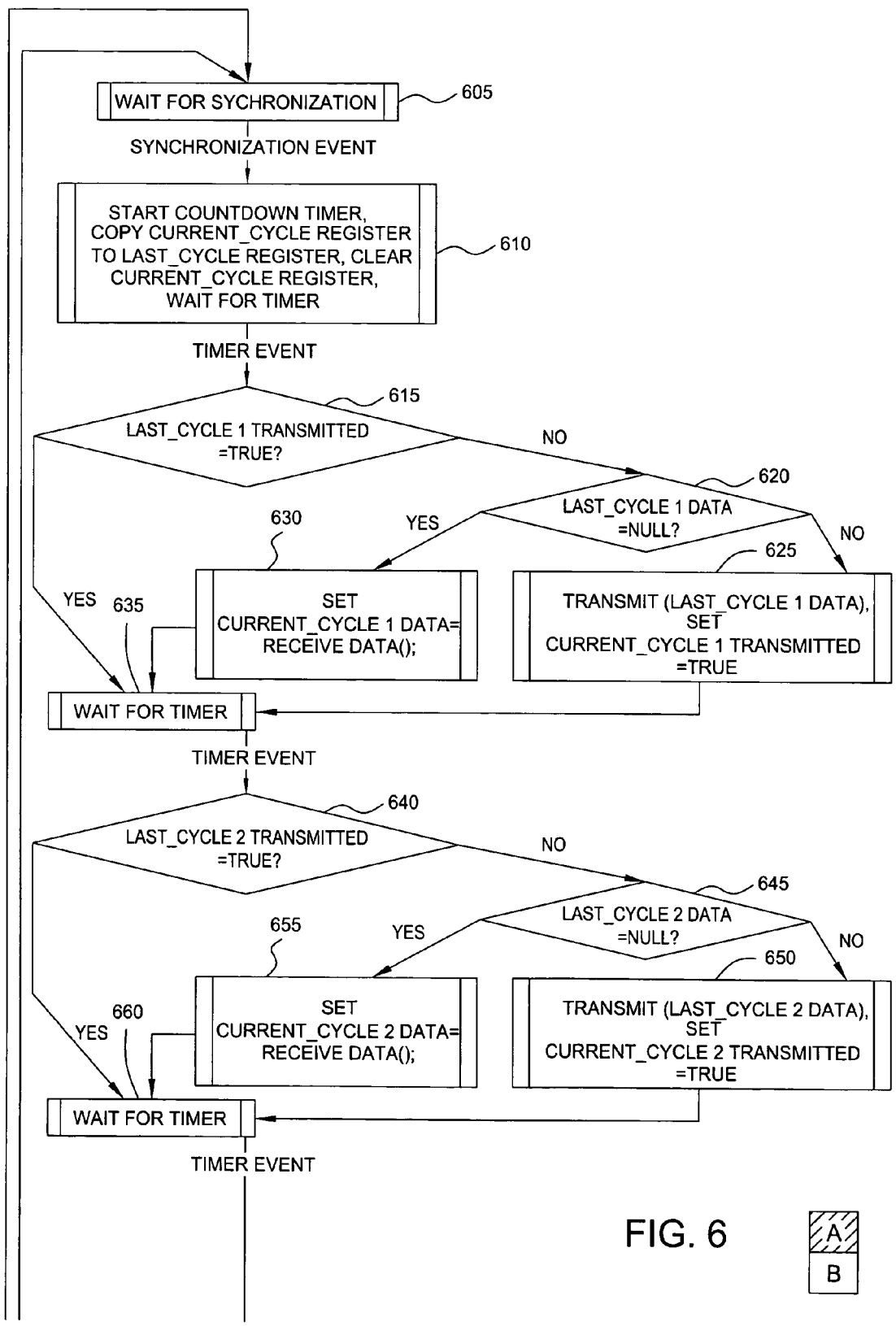
FIG. 6 illustrates a flow diagram of an illustrative method for handling signal propagation by the particulate circuitry in accordance with the current invention.
Figure 6:
Figure 6:
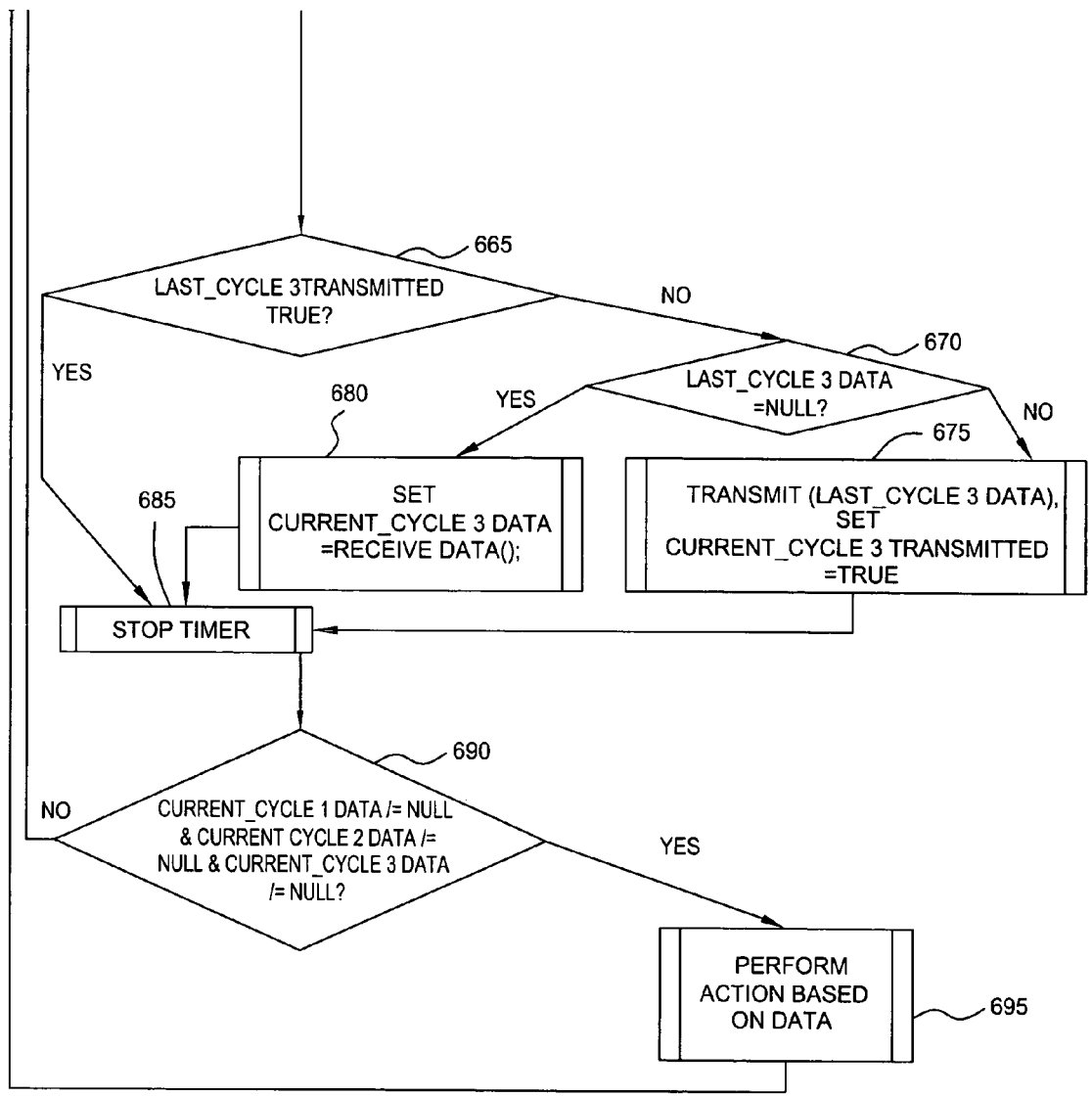

FIG. 6 illustrates a flow diagram of an illustrative method for handling signal propagation by the particulate circuitry in accordance with the current invention. In this signal handling method, the distinction among the three independent signals in their arrival time within a transmit-receive cycle will be used as a trigger for the activation of the device, e.g., coincident arrival will trigger the activation of the device.

Figure 7:
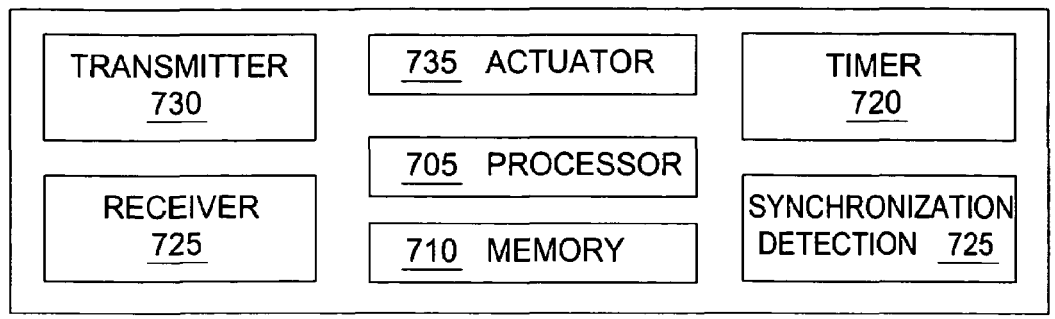
FIG. 7 illustrates a block diagram of a particular circuit of the present invention.

FIG. 7 illustrates a block diagram of a particulate circuit 700 of the present invention. In one embodiment, the particulate circuit 700 may comprise a processor 705 for executing one of methods, e.g., the method illustrated in FIG. 6, a memory 710, e.g., random access memory, a synchronization detection module 715 for detecting a synchronization signal, a timer 720, a receiver 725 that receives transmitted signals from nearby devices, a transmitter 730 that transmits data to nearby devices, and an actuator 735 that can change the physical surroundings of the device in a desired fashion. It should be noted that particulate circuit 700 is only illustrative and should not be interpreted to limit the present invention. For example, it is possible that various components of the particulate circuit 700 can be combined, e.g., where the detection function performed by the synchronization detection module 715 is performed by receiver 725 and processor 705. Namely, receiver 725 can forward the synchronization signal to the processor where the processor has the ability to identify the signal as a synchronization signal.

An exemplary commercial circuitry that can be adapted to be used as the structured elements is the MICA2DOT device from Crossbow Technology of San Jose, Calif. For example, the analog I/O port on the device can be used as an actuator which can be used to open values, take sensor readings, etc. However, the present invention is not limited by this exemplary embodiment.

Additionally, the function of the timer may be implemented without the presence of separate circuitry identifiable as a timer. For example, keeping track of an appropriate number of elapsed processor cycles is often used to serve the same purpose.

The method of FIG. 6 is now disclosed. The reader is encouraged to refer simultaneously to both FIG. 6 and FIG. 7 to better understand the description of the method of FIG. 6.

Returning to FIG. 6, in one embodiment, the start of a transmit-receive cycle is determined by the arrival of a synchronization or start signal. The frequency that the synchronization signal is sent can be varied depending on the requirement of a particular implementation.

In step 605, the method 600 waits for a synchronization signal, e.g., as detected by synchronization detection module 715 and at that point proceeds to process step 610. In step 610, the method 600 starts a timer, e.g., 720, and copies the contents stored within memory 710 that comprises a first register called "current cycle register" to a second register called "last cycle register". The contents may comprise various status flags (e.g., one or more transmission flags, one or more receive data flags) and data (e.g., a gray scale value, a color value, a voltage value, and so on). The contents of the current cycle register are then cleared (set to a logical null) and the method 600 waits for a "first timer event" or "first time slot" to occur. In one embodiment of the present invention, it is assumed that three (3) control signal sources 120 are deployed. Thus, FIG. 6 is described below with respect to three (3) "timer events" or "time slots" for each cycle, but the number of "timer events" can be tailored to the number of control signal sources 120 that are deployed for a particular implementation.

When the appropriate time has elapsed, method 600 proceeds to decision in step 615 in which method 600 queries whether portion of the contents stored in the last cycle register (e.g., a transmission flag) signifies that the device actively transmitted in the first time slot of the previous cycle. If the query is positively answered, then method 600 proceeds to step 635 to await the start of the second time slot. If the query is negatively answered, then method 600 proceeds to decision step 620.

In step 620, method 600 queries whether no data was received and recorded in the first time slot of the previous cycle, e.g., checking the status of the receive data flag. If the query is positively answered, i.e., no data was received and recorded, method 600 proceeds to process step 630 in which incoming data is received and recorded as having been received in the first slot of the current cycle. It then proceeds to process step 635 to await the start of the second time slot.

If the query in step 620 is negatively answered, i.e., data was received and recorded, method 600 proceeds to step 625 in which the data received and recorded is retransmitted and further, an indication that the transmission took place is so recorded, e.g., setting the transmission flag accordingly. Note that the timing of the method should be so arranged that the receive action of step 630 and the transmit action of step 625 should occur at the same time relative to the start of the cycle. Method 600 then proceeds to process step (635) to await the start of the second time slot.

When the timer event occurs that indicates the beginning of the second time slot, method 600 proceeds to decision block 640 in which method 600 queries whether the device actively transmitted in the second time slot of the previous cycle. If the query is positively answered, method 600 proceeds to step 660 to await the start of the third time slot. If the query is negatively answered, then method 600 proceeds to decision step 645.

In step 645, method 600 queries whether no data was received and recorded in the second time slot of the previous cycle. If the query is positively answered, i.e., no data was received and recorded, method 600 proceeds to step 655 in which incoming data is received and recorded as having been received in the second slot of the current cycle. Method 600 then proceeds to step 660 to await the start of the third time slot.

If in query step 645 is negatively answered, i.e., data was received and recorded, then method 600 proceeds to step 650 in which the data received and recorded is retransmitted and further, an indication that the transmission took place is so recorded, e.g., setting the transmission flag. Note that the timing of the method should be so arranged that the receive action of process step 655 and the transmit action of process step 650 should occur at the same time relative to the start of the cycle. The method then proceeds to process step 660 to await the start of the third time slot.

When the timer event occurs that indicates the beginning of the third time slot, method 600 proceeds to decision block 665 in which method 600 queries whether the device actively transmitted in third time slot of the previous cycle. If the query is positively answered, method 600 proceeds to step 685 that ends the third time slot. If the query is negatively answered, method 600 proceeds to decision step 670.

In step 670, method 600 queries whether no data was received and recorded in the third time slot of the previous cycle. If the query is positively answered, i.e., no data was received and recorded, method 600 proceeds to step 680 in which incoming data is received and recorded as having been received in the third slot of the current cycle. Method 600 then proceeds to step 685 that ends the third time slot.

If in query in step 670 is negatively answered, i.e., data was received and recorded, method 600 proceeds to step 675 in which the data received and recorded is retransmitted and further, an indication that the transmission took place is so recorded, i.e., setting the transmission flag. Note that the timing of the method should be so arranged that the receive action of step 680 and the transmit action of step 675 should occur at the same time relative to the start of the cycle. The method then proceeds to step 685 that ends the third time slot.

In step 685, the timer, e.g., 720, is stopped and the method proceeds to decision block 690 in which method 600 queries whether data was received in all three time slots in the current cycle, which would indicate the coincidence condition. If the query is positively answered, method 600 proceeds to step 695 in which the action corresponding to the coincident data is carried out.

In one embodiment, in which only the presence or absence of data has meaning, the device may toggle to current state of the actuator from on to off and vice versa. If there is additional data carried in the signals, e.g., gray scale value, it can be used to indicate alternative actions are desired, e.g., resetting the device, or changing the actuator in ways that could change the displayed color of the pixel and so on. Finally, method 600 will return to the initial process step 605 in time to await the next incoming synchronization signal.

However, if on the other hand, data was not received in all three of the time slots, the program simply returns to step 605 to await the next incoming synchronization signal. It should be noted that FIG. 6 describes a method where a single receiver is used. However, the present invention can be implemented where a plurality of receivers, e.g., three receivers, can be implemented by the particulate circuit where each receiver is tuned to a different frequency of a control source.

Figure 8:
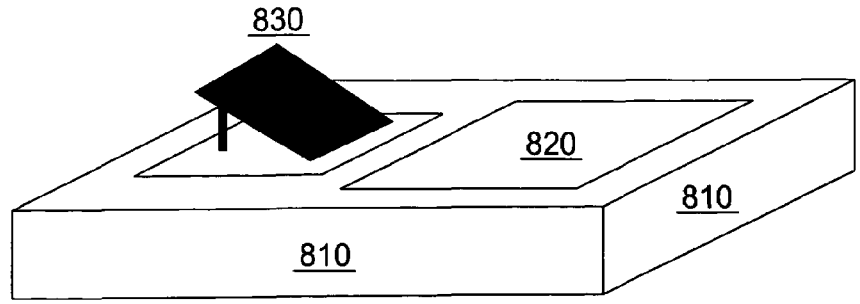
FIG. 8 illustrates an embodiment of a particulate circuitry in accordance with the current invention.

FIG. 8 illustrates an embodiment of a particulate circuitry 800 in accordance with the current invention. In this embodiment, the power supply for the particulate circuit is provided by a photocell region 820 on the circuitry. The synchronization detection circuitry 715 can be coupled to the photocell as well and the synchronization signal is provided by a amplitude modulation of the incoming light, which is also used to provide power to the circuitry. The transmitter 730 and receiver 725 are coupled to a capacitative region 810, serving, effectively, as an antenna. The actuator 735 is represented by a micro electromechanical deflecting mirror 830. When activated in accordance with the current invention, source light impinging on the mirror is deflected toward or away from a preferred direction, resulting in a light or dark patch (pixel) projected on a surface in line with the preferred direction.

Figure 9:
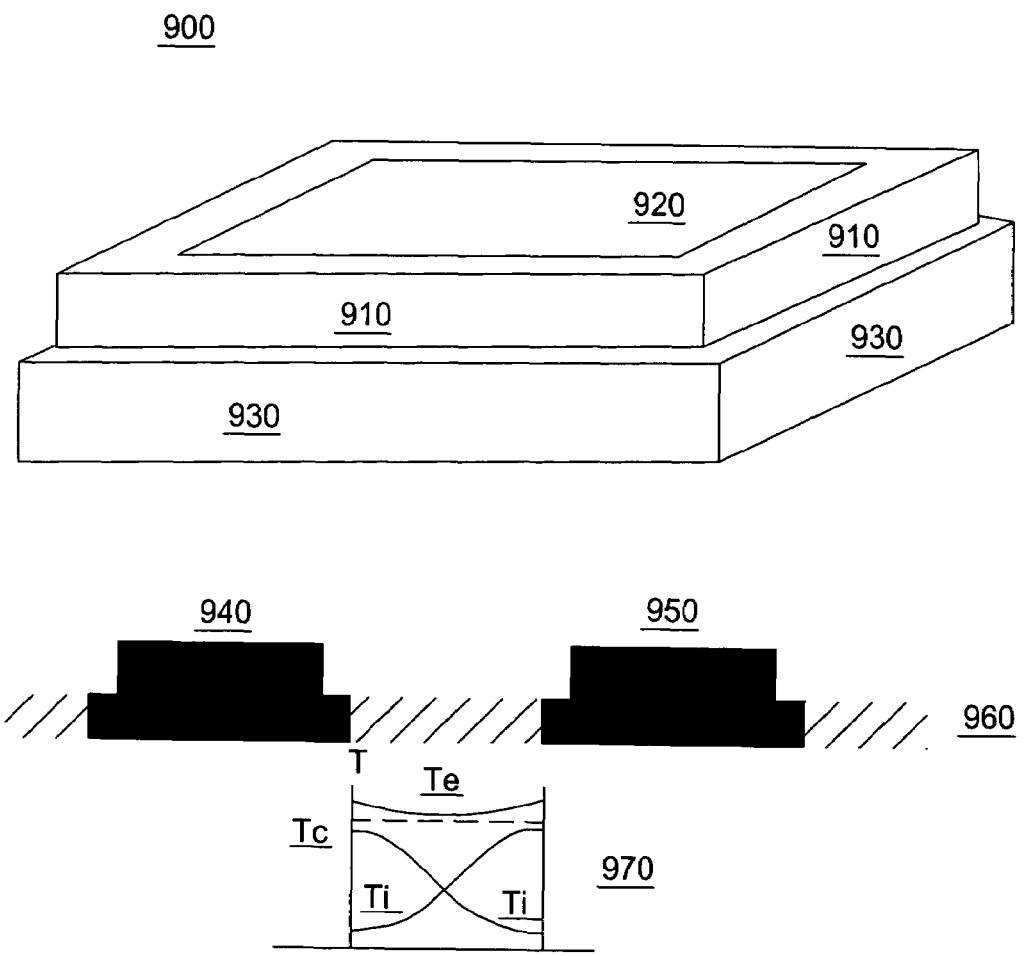
FIG. 9 illustrates an alternate embodiment of a particulate circuit of the present invention.

FIG. 9 illustrates an alternate embodiment of a particular circuit 900 of the present invention. In this embodiment, rather than switching the state of a pixel, the goal is to form a nano-scale, 2-dimensional structure by solidifying a substrate between selected pairs of devices. In this embodiment, the device comprises a capacitative region 910 that, as before, serves as the antenna for the receiver and transmitter; a photovoltaic region 920 that serves as the power supply for the device; and a resistive heating region 930 that forms the actuator in this embodiment. A multiplicity of such devices 940, 950 is embedded in a polymerizable substrate 960 that has a critical polymerization temperature Tc. If one or another neighboring devices is activated by the means of this invention, the resistive heating element produces a temperature rise near the device, falling of with distance from the device in such a manner that in no part of the substrate does the temperature rise above Tc, as illustrated in graph 970. If, on the other hand, two neighboring devices are both activated, the substrate temperature in the entire region between the devices is raised over Tc and this region is solidified. By activating a successive set of neighboring devices, a specific path through the substrate may be polymerized, allowing for the creation of controllably patterned nano-scale structures. These can, for example, serve as the mask for creating complex circuitry, or the armature for creating nano-scale machinery.

Figure 10:
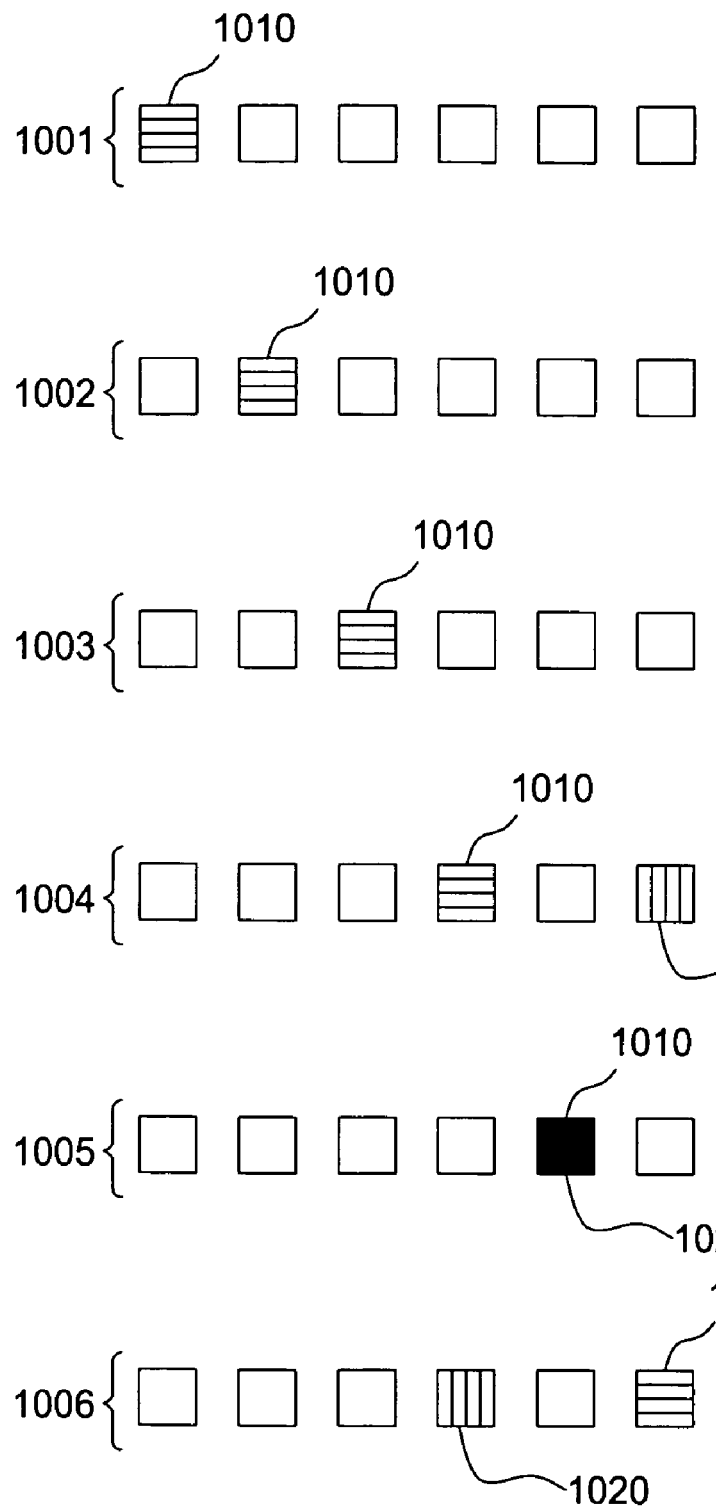
FIG. 10 illustrates an example of a pattern of activation progression of the present invention.

FIG. 10 illustrates an example of a pattern of activation progression of the present invention. In this illustration, the particulate devices have been assembled into a linear grid array with each device sufficiently close to its one or two neighbors to pass on its activation. It should be noted that the present invention is not limited to a rectangular grid configuration, nor is it limited to a one-dimensional array of devices. The configuration is premised on the number of particulate devices that are deployed and the number of control signal sources. The configuration, e.g., a circle, an oval, a triangle and so on, can be any shape such that each particulate device can be uniquely controlled by the intersection of signals from the control signal sources.

FIG. 10 illustrates a particulate device 1010 in row 1001 being activated by or receiving a first signal. Row 1002 illustrates a second particulate device 1010 being activated by or receiving the first signal. Row 1003 then illustrates a third particulate device 1010 being activated by or receiving the first signal. Row 1004 then illustrates a fourth particulate device 1010 being activated by or receiving the first signal, while simultaneously a particulate device 1020 is being activated by or receiving a second signal. Row 1005 then illustrates a particulate device 1010 being activated by or receiving the first signal, while simultaneously a particulate device 1020 being activated by or receiving the second signal. It should be noted that particulate devices 1010 and 1020 are actually the same particular device in row 1005. This coincidence uniquely selects this particulate device for activation in accordance with the current invention. Row 1006 then illustrates the continued propagation of the signal with particulate device 1010 being activated by or receiving the first signal, while simultaneously a particulate device 1020 being activated by or receiving the second signal.

It should be noted that FIG. 10 only provides a simple illustration of the present invention. The present invention contemplates multiple signal sources for arrays of different dimensions. Thus, more than two signal sources can be deployed in the present invention. Additionally, it should be noted that the signals are propagated in one or more predefined directions. Namely, a particulate device can be programmed to propagate the control signals in a direction away from a direction that it received the control signal, e.g., forwarding the signal to the left if the signal was received from the right and so on. It should be noted that the predefined direction(s) of signal propagation for each particulate device is premised on the geometric shape of the array.

Alternatively, each particulate device that receives a new signal may simply propagate the signal in all directions. It is up to a neighboring particulate device that receives the propagated signal to determine whether it should also propagate signal, e.g., determining whether the received signal was a signal that it recently just propagated. In this embodiment, a threshold based on time interval can be set to assist in the determination, e.g., querying whether the received signal was recently received within the last time interval, within the last two time intervals and so on. The actual duration of a time interval can be selected based on implementation requirement.

Figure 11:
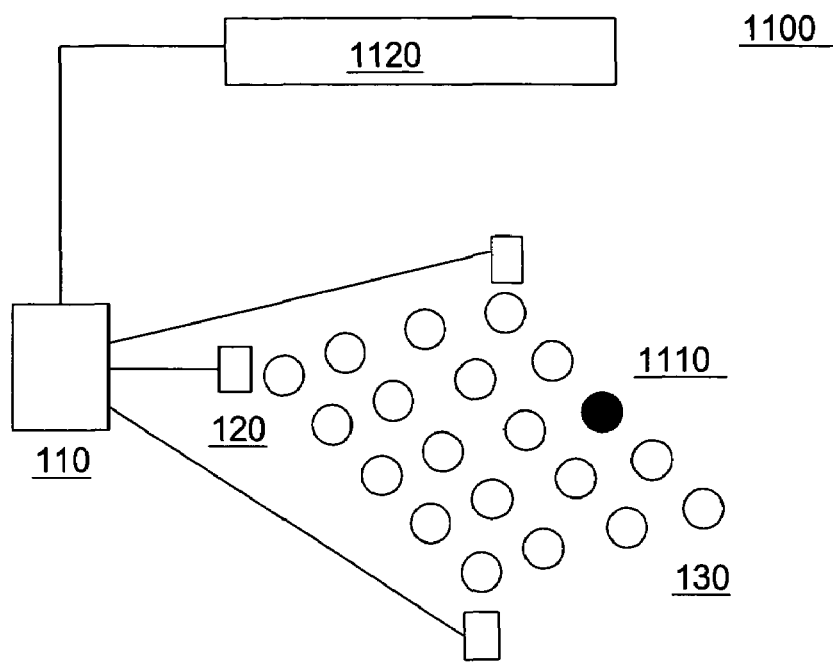
FIG. 11 illustrates use of the current invention to assign identifiers to selected devices.

FIG. 11 illustrates use of the current invention to assign identifiers to selected devices. This may be used as a preparatory step to using said identifiers as an alternate means of addressing the devices through broadcasting.

To illustrate, the controller 110, through control signal sources 120, transmits the n-fold activation signal through the structured elements 130 such that it becomes coincident at the selected structured element 1110. The actuating element at this phase is an additional broadcast receiver that, when activated, captures an identifying signal produced by controller 110 and transmitted through a broadcast transmitter 1120 and stores that identifying signal in memory for comparison with other broadcast signals. Namely, when selected structured element 1110 receives the coincident signals, it will store an identifier that is being broadcasted by the transmitter 1120, e.g., a unique number. Once this unique number is captured and stored by the selected structured element 1110, it can be used to select this structured element 1110 in the future.

Figure 12:
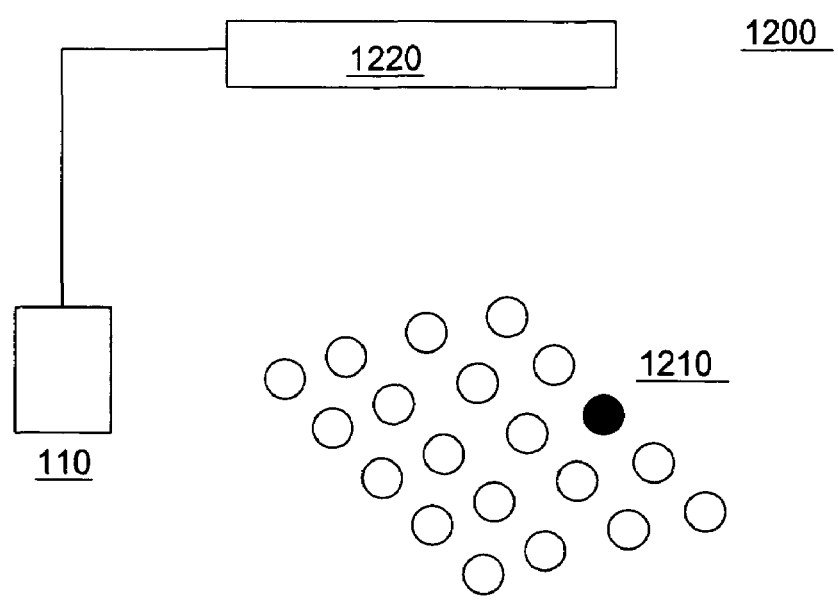
FIG. 12 illustrates the use of a system after the present invention has been applied to assign identifiers to all the particulate devices.

FIG. 12 illustrates the use of the system after the current invention has been applied to assign identifiers to all the particulate devices. In this case, previously activated and identified devices can be flexibly activated by broadcast of its identifier through broadcast transmitter 1220.

For example, in the case of a display, if identifiers have been assigned, then it is now possible to address pixels independent of their location. For example, the controller can issue a command where all pixels have the identifier "n" will activate or where all pixels have the identifier value greater than or less than "n" will activate and so on. Thus, the present invention can be deployed at a setup stage, where the devices will then be dependent on the assigned address alone. Thus, it is possible to deploy the present invention at the manufacturing facility, where the assigned identifiers are then provided and loaded onto an apparatus, e.g., a printer, a display and so on. The operation of the apparatus will then simply use the assigned identifiers to activate the pixels on the display, the nozzles on the print head of the printer, microfluidic pumps and so on.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for addressing a plurality of nano-scaled structured elements embedded in an m-dimensional medium capable of wave-like propagation of signals, each of said plurality of nano-scaled, structured elements being reactive to a local state of the m-dimensional medium, said method comprising steps of:
   a) sending, via a broadcast through said m-dimensional medium in a wave-like propagation from n+1 spatially localized transmitters, a plurality of control signals to the plurality of nano-scaled, structured elements arranged in an n-dimensional array within the m-dimensional medium, where a timing of initiation of said plurality of control signals is varied and each of said plurality of control signals reaches all of said plurality of nano-scaled, structured elements in said n-dimensional array; and
   b) addressing at least one of the plurality of nano-scaled, structured elements, when said plurality of control signals propagating through said m-dimensional medium arrives at a common time at a location of said at least one of the plurality of nano-scaled, structured elements.

2. The method of claim 1, further comprising the step of:
   c) engaging at least one of a plurality of actuating elements that corresponds to said at least one of the plurality of nano-scaled, structured elements that is addressed.

3. The method of claim 2, wherein said actuating elements are print head nozzles.

4. The method of claim 2, wherein said plurality of actuating elements comprises pixel circuitry.

5. The method of claim 2, wherein said actuating elements are microfluidic pumps or gates.

6. The method of claim 2, wherein said actuating elements are voltage sources for interacting with twisting-ball display elements.

7. The method of claim 2, wherein said actuating elements are electromechanical mirrors.

8. The method of claim 2, wherein said actuating elements are resistive heating elements.

9. The method of claim 1, further comprising:
   broadcasting an identifier to be stored by the at least one of the plurality of nano-scaled, structured elements that is addressed.

10. The method of claim 9, further comprising:
    addressing said at least one of the plurality of nano-scaled, structured elements by using said identifier.

11. The method of claim 1, wherein said sending a plurality of control signals comprises a step of passing said plurality of control signals by each of said plurality of nano-scaled, structured elements that receives the plurality of control signals to at least one neighboring structured element.

12. An apparatus for addressing a plurality of nano-scaled structured elements embedded in an m-dimensional medium capable of wave-like propagation of signals, each of said plurality of nano-scaled, structured elements being reactive to a local state of the m-dimensional medium, comprising:
    means for sending, via a broadcast through said m-dimensional medium in a wave-like propagation from n+1 spatially localized transmitters, a plurality of control signals to the plurality of nano-scaled, structured elements arranged in an n-dimensional array within the m-dimensional medium, where a timing of initiation of said plurality of control signals is varied and each of said plurality of control signals reaches all of said plurality of nano-scaled structured elements in said n-dimensional array; and
    means for addressing at least one of the plurality of nano-scaled, structured elements, when said plurality of control signals propagating through said m-dimensional medium arrives at a common time at a location of said at least one of the plurality of nano-scaled, structured elements.

13. The apparatus of claim 12, further comprising:
    means for engaging at least one of a plurality of actuating elements that corresponds to said at least one of the plurality of nano-scaled, structured elements that is addressed.

14. The apparatus of claim 13, wherein said actuating elements are print head nozzles.

15. The apparatus of claim 13, wherein said plurality of nano-scaled, actuating elements comprise pixel circuitry.

16. The apparatus of claim 13, wherein said actuating elements are microfluidic pumps or gates.

17. The apparatus of claim 13, wherein said actuating elements are voltage sources for interacting with twisting-ball display elements.

18. The apparatus of claim 13, wherein said actuating elements are electromechanical mirrors.

19. The apparatus of claim 13, wherein said actuating elements are resistive heating elements.

20. The apparatus of claim 12, further comprising:
    means for broadcasting an identifier to be stored by the at least one of the plurality of nano-scaled, structured elements that is addressed.

21. The apparatus of claim 20, further comprising:
    means for addressing said at least one of the plurality of nano-scaled, structured elements by using said identifier.

22. The apparatus of claim 12, wherein each of said plurality of nano-scaled, structured elements that receives the plurality of control signals passes the plurality of control signals to at least one neighboring structured element.

23. An apparatus having a plurality of nano-scaled, structured elements embedded in an m-dimensional medium capable of wave-like propagation of signals, each of said plurality of nano-scaled, structured elements being reactive to a local state of the m-dimensional medium, comprising:
    a plurality of control signal sources for broadcasting through said m-dimensional medium, in a wave-like propagation via n+1 spatially localized transmitters, a plurality of control signals to the plurality of nano-scaled, structured elements arranged in an n-dimensional array within the m-dimensional medium, where a timing of initiation of said plurality of control signals is varied and each of said plurality of control signals reaches all of said plurality of nano-scaled, structured elements in said n-dimensional array; and
    a controller for addressing at least one of the plurality of nano-scaled, structured elements, when said plurality of control signals propagating through said m-dimensional medium arrives at a common time at a location of said at least one of the plurality of nano-scaled, structured elements.

24. The apparatus of claim 23, further comprising:
    a plurality of actuating elements that correspond to said plurality of structured elements, where an addressed one of the plurality of nano-scaled, structured element effects an activation of its a corresponding actuating element.

25. The apparatus of claim 24, wherein said actuating elements are printing nozzles and said apparatus is a printer.

26. The apparatus of claim 24, wherein said plurality of nano-scaled, actuating elements comprises pixel circuitry and said apparatus is a display.

27. The apparatus of claim 24, wherein said actuating elements are microfluidic pumps or gates and said apparatus is a microfluidic device.

28. A computer-readable medium having stored thereon a plurality of instructions for addressing a plurality of nano-scaled structured elements embedded in an m-dimensional medium capable of wave-like propagation of signals, each of said plurality of nano-scaled, structured elements being reactive to a local state of the m-dimensional medium, the plurality of instructions including instructions which, when executed by a processor, cause the processor to perform steps comprising:
   a) sending, via a broadcast through said m-dimensional medium in a wave-like propagation from n+1 spatially localized transmitters, a plurality of control signals to the plurality of nano-scaled, structured elements arranged in an n-dimensional array within the m-dimensional medium, where a timing of initiation of said plurality of control signals is varied and each of said plurality of control signals reaches all of said plurality of nano-scaled, structured elements in said n-dimensional array; and
   b) addressing at least one of the plurality of nano-scaled, structured elements, when said plurality of control signals propagating through said m-dimensional medium arrives at a common time at a location of said at least one of the plurality of nano-scaled, structured elements.

29. A method for addressing a plurality of nano-scaled structured elements embedded in an m-dimensional medium capable of wave-like propagation of signals, each of said plurality of nano-scaled, structured elements being reactive to a local state of the m-dimensional medium, said method comprising the steps of:
   a) sending, via a broadcast through said m-dimensional medium in a wave-like propagation from n+1 spatially localized transmitters, a plurality of control signals to the plurality of nano-scaled, structured elements arranged in an n-dimensional array within the m-dimensional medium, where a timing of initiation of said plurality of control signals is varied, and wherein said sending comprises passing said plurality of control signals by each of said plurality of nano-scaled, structured elements that receives the plurality of control signals to at least one neighboring structured element of said each of said plurality of nano-scaled, structured elements and wherein each of said plurality of control signals reaches all of said plurality of nano-scaled, structured elements in said n-dimensional array; and
   b) addressing at least one of the plurality of nano-scaled, structured elements, when said plurality of control signals propagating through said m-dimensional medium arrives at a common time at a location of said at least one of the plurality of nano-scaled, structured elements.

* * * * *